United States Patent [19]

Sunayama et al.

[11] Patent Number: 5,597,498

[45] Date of Patent: Jan. 28, 1997

[54] METHOD FOR WELDING CORRUGATE PORTIONS BY MEANS OF WELDING ROBOT FOR CORRUGATION LAP JOINT

[75] Inventors: Kazuyuki Sunayama, Toyonaka; Kunio Miyawaki, Kobe; Minoru Ohno, Kumamoto-ken; Tatsuo Miyazaki, Arao, all of Japan

[73] Assignee: Hitachi Zosen Corporation, Osaka, Japan

[21] Appl. No.: 506,242

[22] Filed: Jul. 24, 1995

[30] Foreign Application Priority Data

| Jul. 29, 1994 | [JP] | Japan | 6-177354 |
| Jul. 29, 1994 | [JP] | Japan | 6-177357 |
| Mar. 10, 1995 | [JP] | Japan | 7-050261 |
| Jun. 9, 1995 | [JP] | Japan | 7-142288 |

[51] Int. Cl.⁶ .................................................. B23K 9/127
[52] U.S. Cl. ........................... 219/124.34; 219/124.33; 219/125.1
[58] Field of Search ............... 219/124.34, 125.1, 219/124.33, 124.31; 901/42

[56] References Cited

U.S. PATENT DOCUMENTS

| 2,441,748 | 5/1948 | Black | 219/124.34 |
| 3,150,624 | 9/1964 | Brems | 219/124.34 |
| 4,008,384 | 2/1977 | Cecil | 219/125 |
| 4,068,154 | 1/1978 | Cecil et al. | 219/124.34 |
| 4,248,372 | 2/1981 | Nomura et al. | 219/124.31 |
| 4,296,306 | 10/1981 | Nomura et al. | 219/124.34 |
| 4,404,455 | 9/1983 | Gotoh | 219/124.34 |
| 4,750,663 | 6/1988 | Warczak | 219/124.34 |

FOREIGN PATENT DOCUMENTS

| 0370682 | 11/1990 | European Pat. Off. . |
| 0611217 | 2/1994 | European Pat. Off. . |

Primary Examiner—Clifford C. Shaw
Attorney, Agent, or Firm—Barnes, Kisselle, Raisch, Choate, Whittemore & Hulbert, P.C.

[57] ABSTRACT

There is disclosed a method for the plasma arc welding of corrugate membranes, which can prevent a welding failure from occurring around the corrugate portion. In this welding method, NC data for robot control are modified so as to gradually change a torch angle around the R portions at a rate not greater than the maximum angular velocity and increase a welding speed around the R portions of foot regions of corrugate portions 1B and 2B and the R portion of an apex 22 before a welding torch 12 reaches the R portions. Three parameters are prepared for determining the deformation of the corrugate portions 1B and 2B in terms of height, width of the foot regions and the swell of the trunk portion. Data indicative of the height and foot width of the corrugate portion measured by a laser displacement sensor 15 are compared with standard corrugation NC data, and the NC data for robot control are modified to correct the height, foot width and swell degree thereof by utilizing the parameters.

5 Claims, 12 Drawing Sheets

METHOD FOR WELDING CORRUGATE PORTIONS BY MEANS OF WELDING ROBOT FOR CORRUGATION LAP JOINT

BACKGROUND OF THE INVENTION

1. Field of the Invention

The present invention relates to methods for welding together corrugate membranes and, more particularly, to methods for welding corrugate portions by means of a welding robot for corrugation lap joint.

2. Description of Related Arts

In the welding of corrugate membranes, it has been a conventional practice to employ a contact-type sensor for shape recognition and a tracer control system for the control of the torch angle of a welding torch. Where a plasma arc welding process which is faster in the welding speed than a conventional TIG welding process is employed for the welding of membranes, the tracer control of the welding torch for the welding of corrugate portions is more liable to cause a welding failure because the torch angle control cannot follow up the sensing of the contact-type sensor. To this end, a delayed control system has been proposed in which a sensor travels ahead of a welding torch to allow the welding torch to follow up the sensor more easily. In the high-speed plasma arc welding process, the delayed control system allows the welding torch to appropriately trace a weld line by comparing a corrugate configuration of a membrane to be welded with preliminarily provided corrugation NC data and determining the corrugate configuration.

Where the welding speed and the torch angle with respect to the weld line are controlled to be constant by utilizing the corrugation NC data corresponding to the corrugate configuration, a welding failure tends to occur in the following portions:

(1) where the inclination drastically changes;
(2) where residual heat of welding adversely affects a weld bead; and
(3) where different welding conditions are required because the membrane is mounted in a different orientation.

In the welding of corrugate portions by a conventional welding robot, every membrane is considered to have the same corrugate configuration. Corrugation NC data to be utilized when a robot control software is implemented are selected based on the corrugate configuration, and the welding of the corrugate portions is controlled by the delayed control system. Where the membranes do not have exactly the same corrugate configuration or where the positioning of the membranes is inappropriate, however, the corrugate portions may be deformed when the membranes are temporarily welded. In such a case, when a welding torch traces a weld line based on the aforesaid standard corrugation NC data, the welding torch may miss a welding target due to the deformation of the corrugate portions, thereby causing a welding failure.

SUMMARY OF THE INVENTION

To solve the aforesaid problem, it is an object of the present invention to weld corrugate portions by appropriately controlling a welding speed and welding torch angle to obtain an excellent weld bead in the welding of corrugate membranes.

To achieve the aforesaid object, the present invention provides a method for welding corrugate portions by means of a welding robot for corrugation lap joint, which comprises the steps of: employing a delayed control system in which a sensor travels ahead of the welding robot; preliminarily storing a plurality of standard corrugate configurations as NC data; selecting NC data corresponding to a configuration of a corrugate portion to be welded from the NC data preliminarily stored; preparing corrugation NC data to be utilized when a robot control software is implemented, based on the selected NC data; and employing parameters for arbitrarily changing a welding speed and welding torch angle along with the corrugation NC data to control the welding speed and the welding torch angle for welding the corrugate portions, thereby obtaining an excellent weld bead.

In accordance with this method, when a welding operation is performed on an R portion around the foot region of the corrugate portion where the inclination thereof drastically changes, for example, the welding torch is controlled so that the torch angle is gradually changed at a rate of not greater than a predetermined maximum angular velocity. Therefore, the torch angle can be changed smoothly around the R portion. When the welding operation is performed on an R portion around the foot region of the corrugate portion where the radius of the curvature is small and the heat dispersion per unit welding length is lower than that on a flat portion, or on an R portion around the apex of the corrugate portion where thermal intensification occurs as the welding torch is travelled with the head thereof being oriented to one particular point, the welding speed is increased to reduce the thermal application to a weld line. When the welding operation is performed on a portion along a weld line of the corrugate portion where the weight of fusion is applied thereto in a manner different from the other portions due to a different mounting orientation of the membrane, the welding speed and welding torch angle is properly adjusted to prevent the fusion from sagging. Thus, the welding speed and welding torch angle can be properly controlled in the welding of the corrugate portion, thereby providing an excellent weld bead.

The aforesaid welding method of the present invention can prevent a welding failure which tends to occur in the conventional welding method due to the movement of the welding torch in a weld portion: where the inclination drastically changes; where residual heat of welding adversely affects a weld bead; or where different welding conditions are required because the membrane is mounted in a different orientation.

It is another object of the present invention to accurately weld corrugate portions by detecting the deformation of the corrugate portions based on information from a laser displacement sensor and correcting standard NC data.

To achieve the aforesaid object, the present invention provides a method for welding corrugate portions by means of a welding robot for corrugation lap joint, comprising the steps of: employing a delayed control system in which a sensor travels ahead of the welding robot; preliminarily storing standard corrugate configurations as NC data; quantifying a deformation degree of the corrugate portion to be welded based on information indicative of the height and foot width of the corrugation measured by means of the sensor; modifying the standard corrugate NC data to be utilized when a robot control software is implemented, based on the quantified deformation degree by calculation to obtain execution NC data; and controlling an operation of welding the corrugate portion by utilizing the execution NC data.

In accordance with this method, the welding robot modifies the standard corrugation NC data to be utilized when a robot control software is implemented on the basis of the information indicative of the height and foot width of the corrugate portion. Therefore, a welding failure can be prevented which has conventionally occurred when the welding torch missed a welding target due to the deformation of the corrugate portion.

These and other objects, features and functions of the present invention will be apparent from the following detailed description of preferred embodiments with reference to the attached drawings.

DESCRIPTION OF THE PREFERRED EMBODIMENTS

A first preferred embodiment of the present invention will be hereinafter described.

An explanation will first be given to the construction of a welding robot applicable to a high-speed plasma arc welding process utilizing a delayed control system in which a sensor travels ahead of the welding robot.

Figure 1:
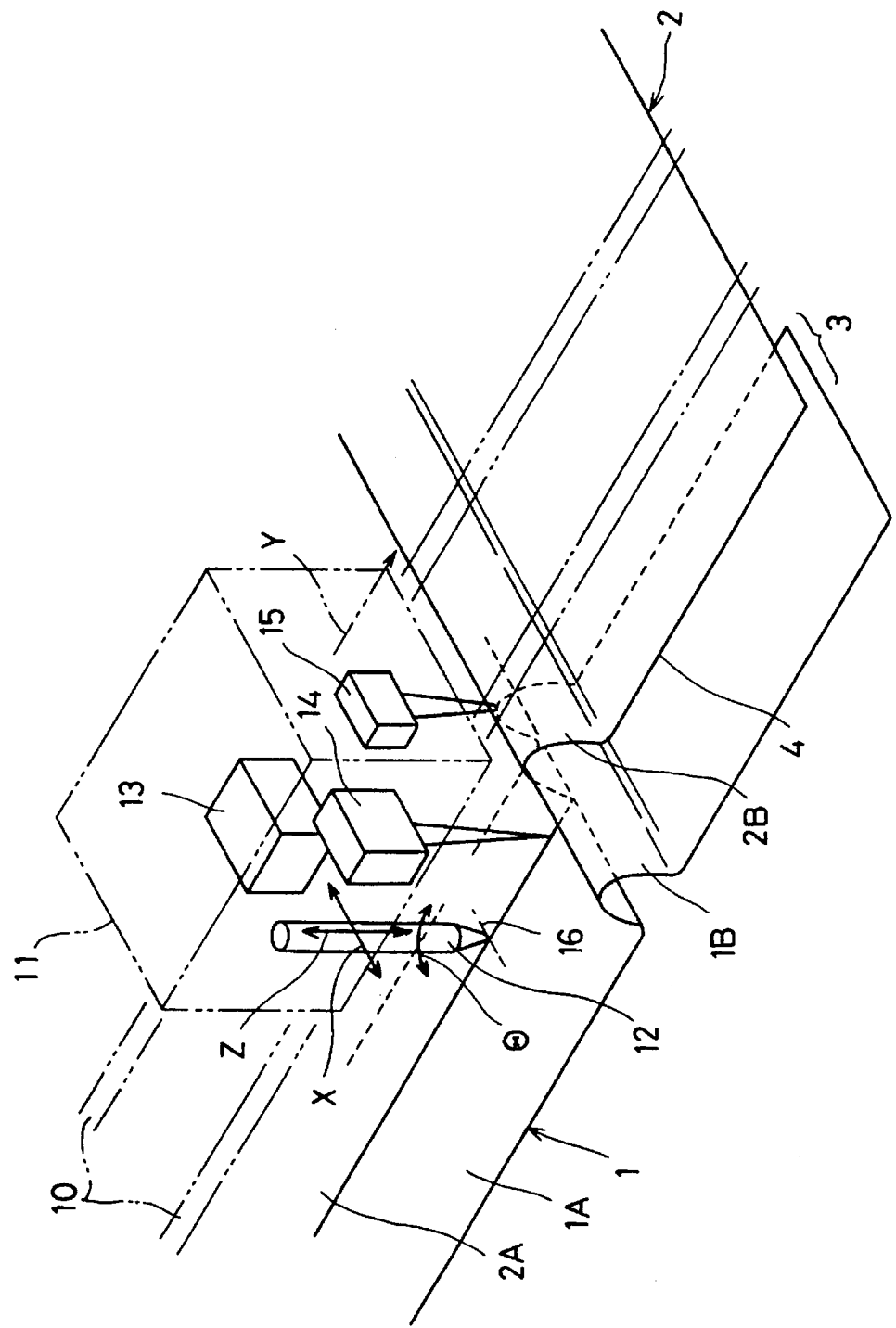
FIG. 1 is a schematic perspective view illustrating a welding robot for corrugation lap joint.
Figure 2:
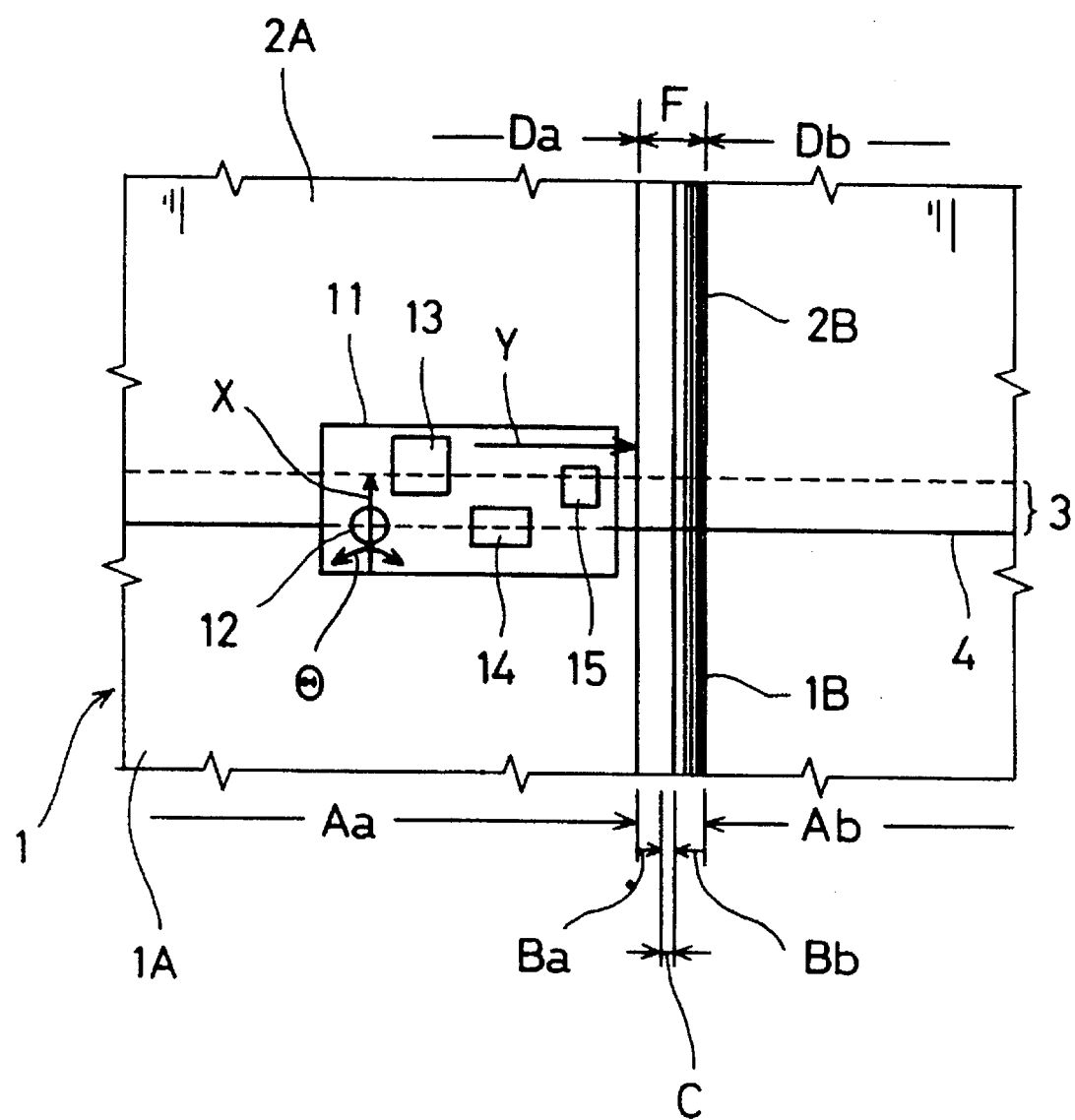
FIG. 2 is a schematic plan view illustrating the welding robot for corrugation lap joint.

Referring to FIGS. 1 and 2, corrugate membranes 1 and 2 respectively have corrugate portions 1B and 2B formed in predetermined intervals on flat portions 1A and 2A thereof. The membranes 1 and 2 are overlapped to each other at the edge portions thereof with the corrugate portions 1B and 2B being vertically overlapped and thereby a corrugation lap-joint portion 3 is formed which extends in a direction perpendicular to longitudinal axes of the corrugate portions 1B and 2B. Along the corrugation lap joint portion 3, the edge of the upper membrane 2 defines a weld line 4.

Guide rails 10 extending parallel to the weld line 4 are disposed above the weld line 4. A welding machine body 11 supported and guided by the guide rails 10 is allowed to travel in a direction Y along the weld line 4.

The welding machine body 11 has a welding torch 12 which is movable in a transverse direction X and a vertical direction Z both extending perpendicular to the weld line 4. The welding torch 12 is pivotally movable in an arcuate direction Θ about a horizontal axis 16 extending parallel to the transverse direction X from an arc tip of the torch head. The welding torch 12 is of a plasma arc welding type. The welding machine body 11 further includes a control device 13 for controlling the movement of the welding torch 12 in the transverse direction X and vertical direction Z and the pivotal movement thereof in the arcuate direction Θ. The control device 13 comprises a delay circuit. The welding machine body 11 further includes a visual sensor 14 disposed forwardly of the welding torch 12 and adapted to travel ahead of the welding torch 12 for the seam tracking of the weld line and a laser displacement sensor 15 disposed laterally of the visual sensor 14 for the measurement of the corrugate configuration.

There will next be described a welding operation of corrugation lap joint to be performed by a welding robot having the aforesaid construction. By adjusting the guide rails 10, the welding torch 12 and visual sensor 14 attached to the welding machine body 11 are positioned above the weld line 4 as shown in FIG. 2. The laser displacement sensor 15, though not located just above the weld line 4, can detect the configuration of the corrugate portion without any trouble. However, the laser displacement sensor 15 should be located forwardly of the welding torch 12. By moving the welding machine body 11 along the guide rails 10, measurement is carried out by means of the sensors 14 and 15, while the welding torch 12 performs the plasma arc welding along the weld line 4 at a predetermined welding speed. At this time, the laser displacement sensor 15 senses the surface of the membrane 2, and the visual sensor 14 tracks the seam or the weld line 4. The sensors 14 and 15 are traveled ahead of the welding torch 12 as described above. The delay in the traveling of the welding torch 12 is controlled by the delay circuit incorporated in the control device 13. More specifically, the movement of the welding torch 12 in the transverse direction X and the vertical direction Z and the pivotal movement about the horizontal axis 16 in the arcuate direction Θ are controlled with a time lag.

Figure 3:
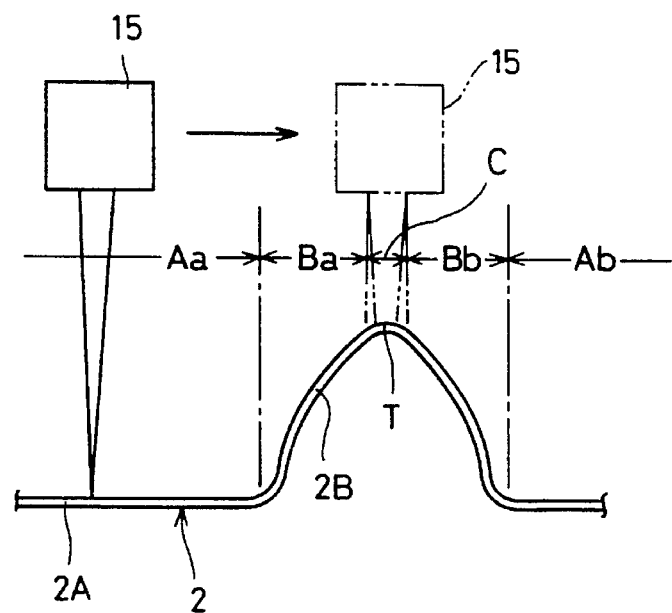
FIG. 3 is an explanatory diagram illustrating the measurement by means of a laser displacement sensor.

As shown in FIG. 3, the laser displacement sensor 15 senses a front flat region Aa of the flat portions 2A in an ordinary way. When facing opposite to an uprising slope region Ba of the corrugate portion 2B, the laser displacement sensor 15 cannot receive reflected light because of a large inclination angle of the uprising slope region Ba and, hence, becomes unable to perform measurement. When facing opposite to an apex region C, the laser displacement sensor 15 becomes able to receive light reflected on a relatively flat portion of the apex region C and, hence, becomes able to perform measurement. When facing opposite to a down slope region Bb, the laser displacement sensor 15 becomes unable to perform measurement. When facing opposite to a rear flat region Ab of the flat portion 2A, the laser displacement sensor 15 again becomes able to perform measurement. In the measurement by means of the laser displacement sensor 15, the apex T which is the highest in altitude in the apex region C is regarded as the center of the corrugate portion 2B.

Plural kinds of standard configurations of the corrugate portion 2B are preliminarily stored in the control device 13. The control device 13 selects one standard configuration based on the position of the apex T input from the laser displacement sensor 15, and selects NC data of the weld line 4 of the corrugate portion which is to be utilized when a robot control software is implemented. With a predetermined time lag, the welding torch 12 is operated on the basis of the aforesaid NC data. Thus, the welding speed on the corrugate portion 2B, the movement of the welding torch 12 in the vertical direction Z and the pivotal movement thereof about the horizontal axis 16 in the arcuate direction Θ can be controlled. That is, the torch angle θ can be appropriately changed.

Figure 4:
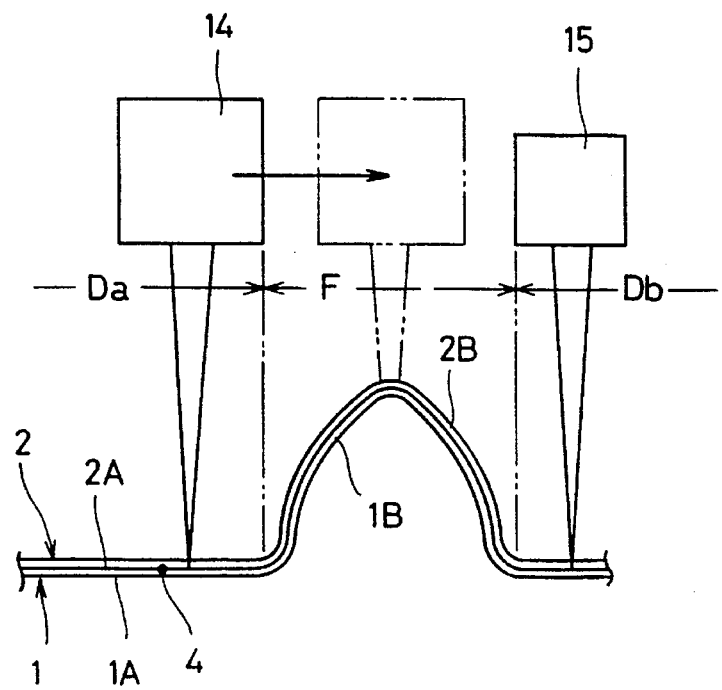
FIG. 4 is an explanatory diagram illustrating the measurement by means of a visual sensor.

As shown in FIG. 4, the visual sensor 14 tracks the seam or the weld line 4 in a front weld line region Da on the flat portions 1A and 2A in an ordinary way. When facing opposite to a corrugate weld line region F, the visual sensor 14 becomes unable to perform measurement. This is because the corrugate portion has a high inclination and therefore becomes out of focus of the visual sensor 14. The visual sensor 14 is unable to perform measurement throughout the corrugate weld line region F, and when facing opposite to a rear weld line region Db, becomes able to perform measurement again. In the corrugate weld line region F and the weld line regions Da and Db located adjacent thereto, the edge of the membrane 2 generally extends along a straight line as viewed from the top. Therefore, the movement of the welding torch 12 in a transverse direction X can be controlled by defining the weld line 4 in the corrugate weld line region F, for example, between the coordinates of a starting point of the corrugate portion detected in the front weld line region Da and the coordinates of a terminal point of the corrugate portion detected in the rear weld line region Db.

Next, an operation of the welding torch 12 around the corrugate portion will be described in detail.

Figure 5:
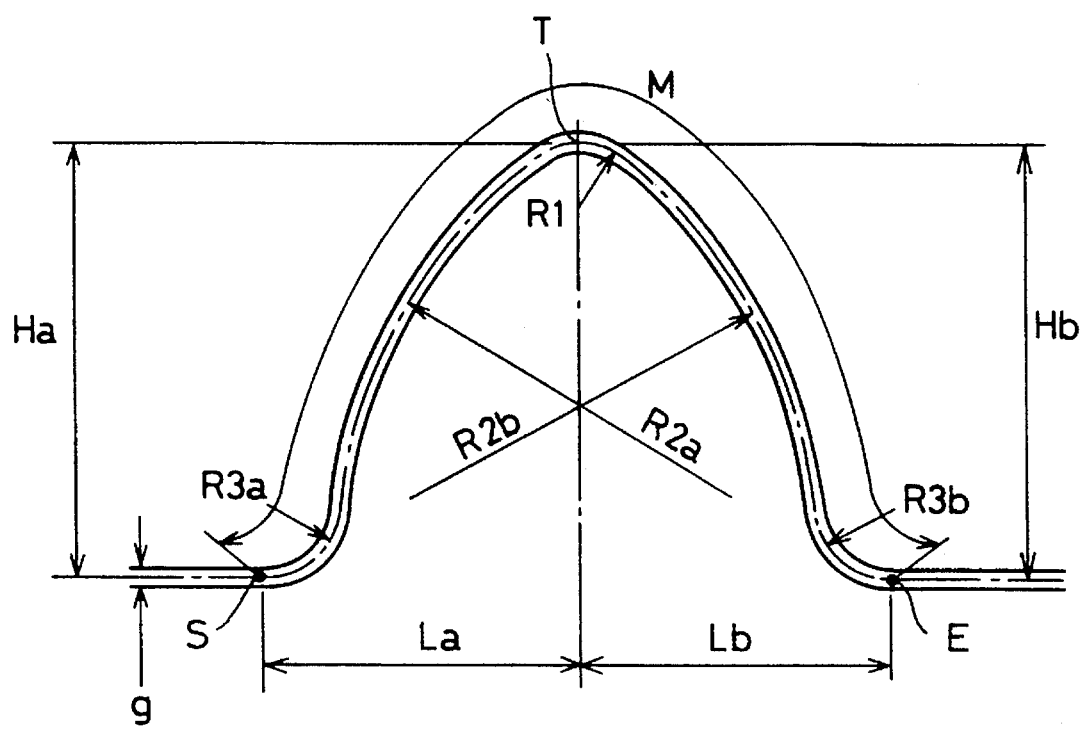
FIG. 5 is a diagram illustrating the dimensions of major portions of a corrugate portion.

As shown in FIG. 5, standard corrugate configurations each have a region R1 defining an apex region C, a region R2a defining an uprising slope region, a region R2b defining a down slope region, a region R3a defining an uprising foot region, and a region R3b defining a down foot region. The standard corrugate configurations are each represented by an uprising foot width La defined between the apex T and a starting point S of the uprising foot region, a down foot width Lb defined between the apex T and a terminal point E of the down foot region, heights Ha and Hb of the apex respectively measured from the level of the front flat region Aa and from the level of the rear flat region Ab, a thickness g of the membrane, and a length M measured along the contour of the corrugate portion from the starting point S of the uprising foot region through the apex T to the terminal point E of the down foot region. Each of the standard corrugate configurations is defined by calculating the coordinates of the centers and conjuncture points of three arcs linked together.

Plural kinds of corrugate configurations thus defined are preliminarily stored in a memory of the control device. When the corrugate portion is to be welded, the control device selects one corrugate configuration from the preliminarily stored corrugate configurations, based on the position of the apex of the corrugate portion detected by the laser displacement sensor, and then corrugation NC data which are to be utilized when the robot control software is implemented are prepared on the basis of the selected corrugate configuration.

In the conventional practice, corrugation NC data are prepared in the following manner, based on the corrugate configuration thus determined.

Figure 6A:
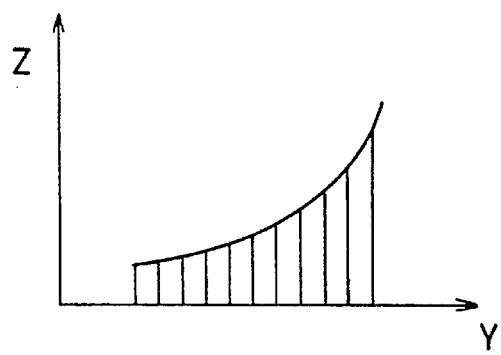
FIGS. 6(a), 6(b), and 6(c) are explanatory diagrams illustrating a calculation method of corrugate NC data.
Figure 6B:
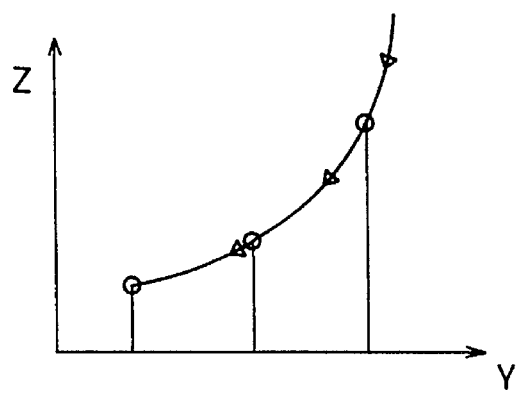
Figure 6C:
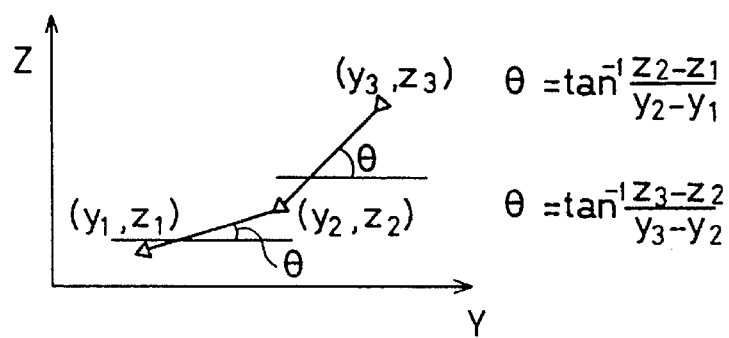
Figure 7:
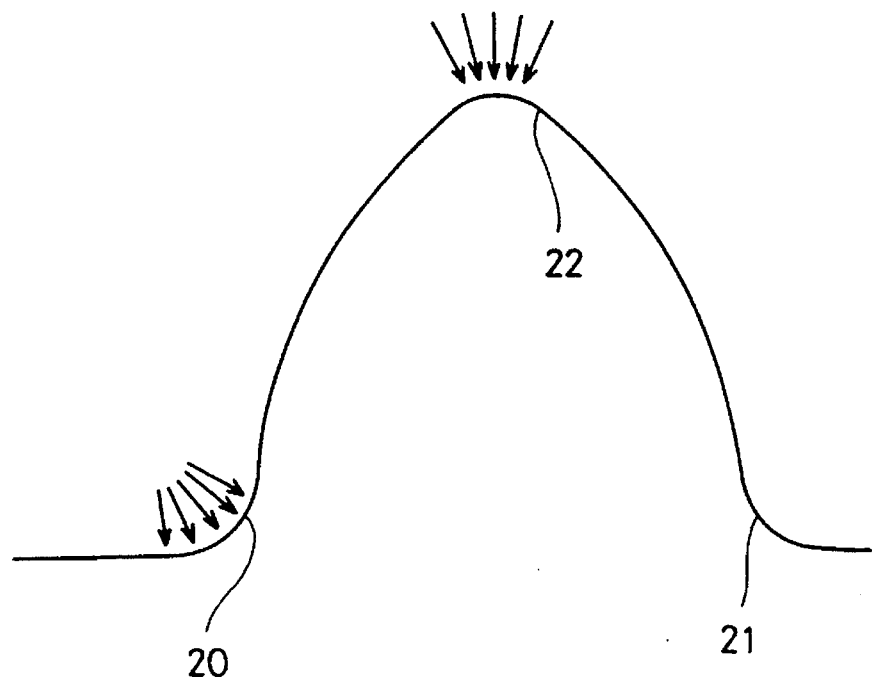
FIG. 7 is a diagram for explaining weld portions where the inclination drastically changes and where thermal remain tends to occur.

FIG. 6(a) shows part of a weld line. A curve of the weld line in a two-dimensional coordinate system is divided on a basis of unit width along the Y-axis, and Y-axis data and Z-axis data are calculated. The calculated Y-axis data and Z-axis data are corrected so that the welding torch travels a constant distance per a unit time period, by equidistantly dividing the curve of the weld line as shown in FIG. 6(b). In FIG. 6(a), plots o represent data obtained by the first calculation, and plots Δ represent data corrected so that the welding torch travels at a predetermined constant speed. Therefore, the distance between two adjacent plots Δ is constant. As shown in FIG. 6(c), torch angles θ formed between a horizontal line and a line defined between respective two adjacent plots of the corrected data are calculated. Based on the corrected data (y1, z1) to (y3, z3) and the torch angles θ1 and θ2, for example, corrugation NC data are prepared which are to be utilized when the robot control software is implemented. While the height of the welding torch is controlled in accordance with the corrugation NC data, the welding speed and torch angle with respect to the weld line are controlled to be constant.

Where the welding speed and torch angle with respect to the weld line are controlled to be constant, however, the conventional control process is not satisfactory, i.e., a welding failure tends to occur in the following portions. More specifically, the inclination of the weld portion drastically changes in the uprising foot region 20 and down foot region 21 of the corrugate portion and, therefore, the torch angle should be rapidly changed. This requires the welding torch 12 to travel at a high angular velocity in the uprising foot region 20 and the down foot region 21, thereby causing a welding failure. The arcuate portions of the foot regions 20 and 21 each have a small curvature radius and, therefore, heat dispersion per unit weld length is smaller than that in flat portions. This may result in the intensification of residual heat. Around the arcuate portion of the apex 22 of the corrugate portion, heat intensification tends to occur because the traveling welding torch is oriented toward one particular point, thereby causing a welding failure.

Figure 8:
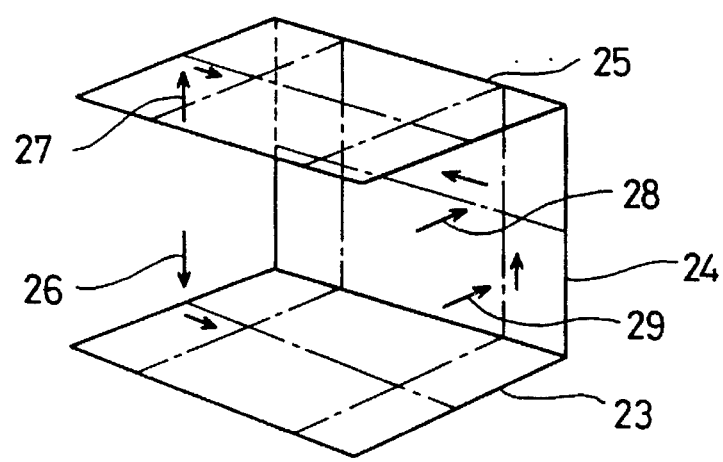
FIG. 8 is a diagram for explaining the mounting orientation of membranes.

In FIG. 8, there are shown a bottom membrane 23, side membrane 24 and top membrane 25. When the welding is performed on the bottom membrane 23, the torch 12 assumes a downward orientation perpendicular to the bottom membrane 23. When the welding is performed on the top membrane 25, the torch 12 assumes an upward orientation perpendicular to the top membrane 25. When the welding is performed on the side membrane 24, the torch 12 assumes a sideward orientation perpendicular to the side membrane 24, and travels in a horizontal or lateral direction or in a vertical direction. When the torch 12 travels in the vertical direction, for example, fusion sags by its own weight around the apex of the corrugate portion, thereby causing a welding failure.

In accordance with this embodiment, the welding speed and the welding torch angle are kept constant in a conventional manner. In addition, the welding speed and the welding torch angle are variably controlled to obtain an excellent weld bead when a portion liable to cause a welding failure is welded.

Figure 9:
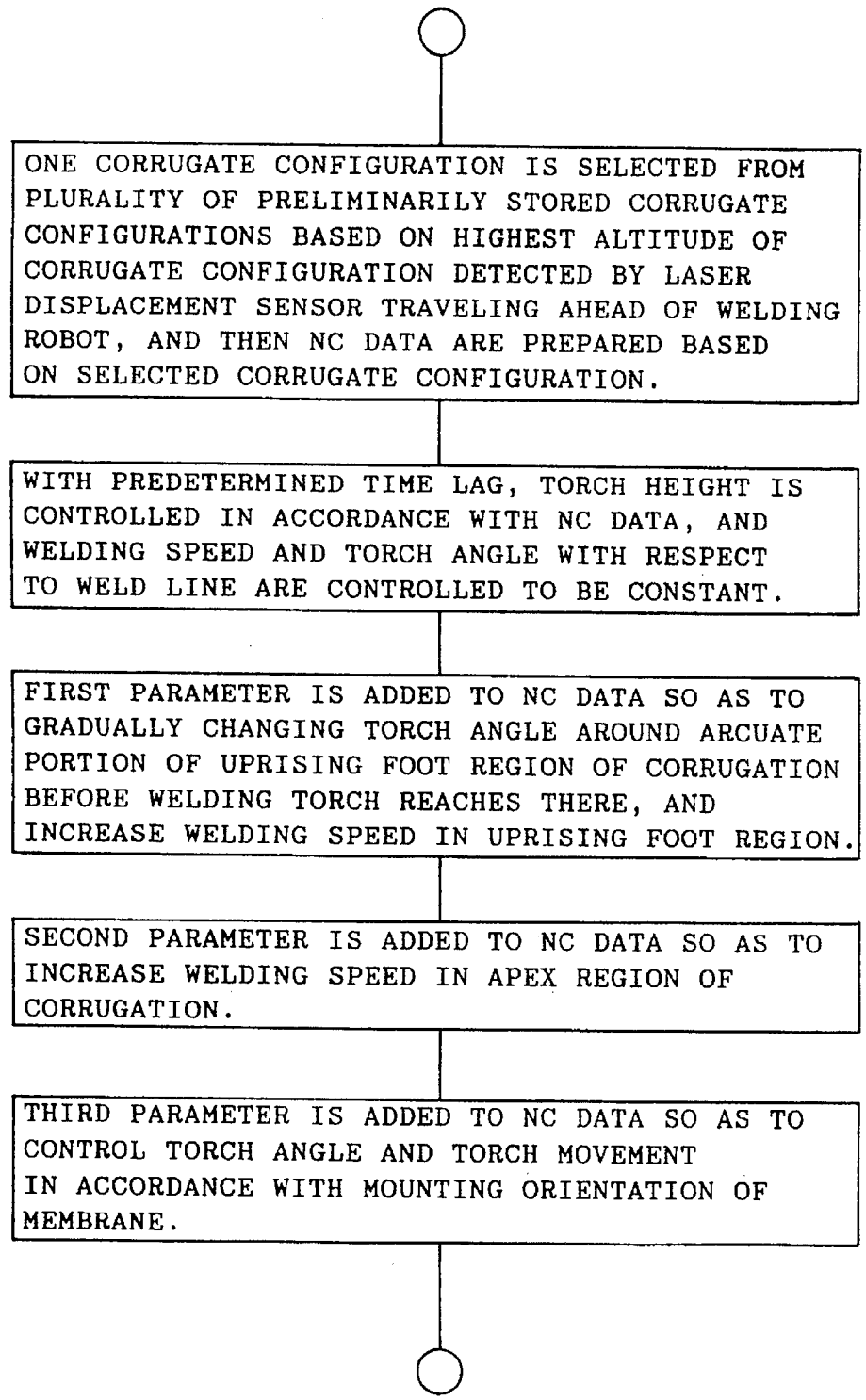
FIG. 9 is a flow chart illustrating a method for welding corrugate portions by means of a welding robot for corrugation lap joint in accordance with a first embodiment of the present invention.

FIG. 9 is a flow chart illustrating a method for welding corrugate portions by means of the welding robot for corrugation lap joint in accordance with a first embodiment of the present invention. The essential point is that the welding speed and welding torch angle are changed by employing the following parameters along with corrugation NC data to be utilized when the robot control software is implemented. The parameters herein mean factors and constants for arbitrarily changing the welding speed and welding torch angle when arcuate portions of a corrugate portion liable to cause a welding failure are welded.

Figure 10:
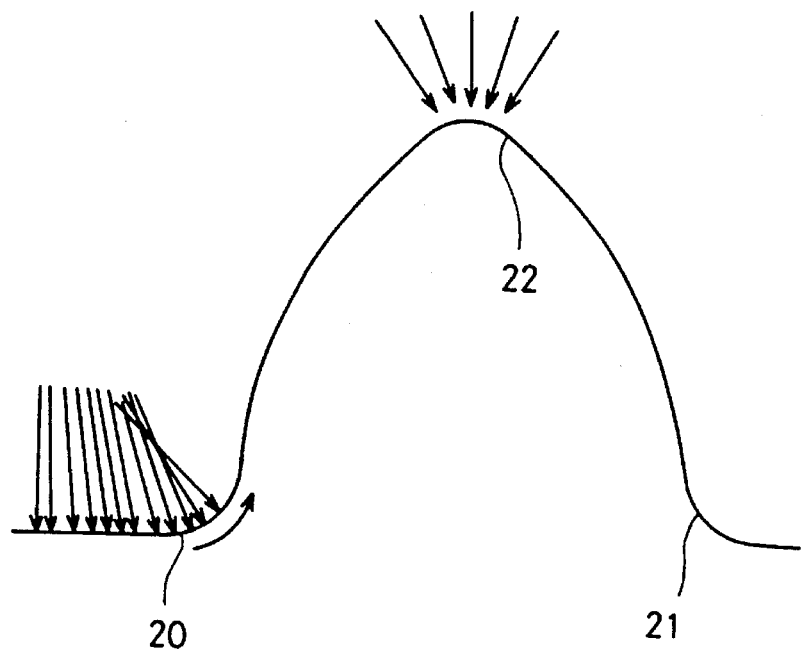
FIG. 10 is a diagram illustrating a method for controlling a welding torch angle in the welding method of the first embodiment.

FIG. 10 is a diagram illustrating a welding control to be performed when the welding operation is carried out on a portion where the inclination drastically changes or on a portion where residual heat tends to be intensified. As shown in FIG. 10, the torch angle is gradually changed around the arcuate portion of the uprising foot region 20 of the corrugation before the welding torch reaches the arcuate portion. This eliminates the need for rapidly changing the torch angle around the arcuate portion of the uprising foot region 20, whereby the torch angle is smoothly changed. At this time, the torch angle is changed at a rate of not greater than a predetermined maximum angular velocity.

The arcuate portion of the uprising foot region 20 has a small curvature radius and the heat dispersion per unit welding length is smaller than that of a flat portion. Therefore, the welding speed is rendered faster around the arcuate portion to reduce heat application to the weld line. The arcuate portion of the down foot region 21 of the corrugate portion is welded in the same manner as the above. Further, the welding torch travels around the arcuate portion of the apex 22 with the head thereof being orienting toward one particular point, whereby heat tends to be intensified around the apex 22. Therefore, at least the welding speed is increased around the apex 22 to reduce heat application to the weld line. The welding control is achieved by employing the parameters along with corrugation NC data to be utilized when the robot control software is implemented. The parameters to be adjusted include the welding speed, the torch angle, torch angular velocity. The torch angular velocity is adjusted to the maximum, and the welding speed and the torch angle are determined, for example, by repeated experiments. Thus, the welding speed and the welding torch angle can be appropriately controlled, thereby eliminating a welding failure which has been caused due to the inappropriate movement of the welding torch.

Figure 11:
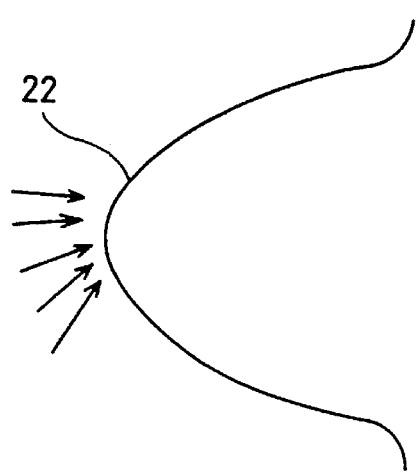
FIG. 11 is a diagram for explaining a method for controlling the welding torch angle in case that the mounting orientation of a membrane is changed.

FIG. 11 is a diagram for explaining a method for controlling the welding torch angle in a case where the mounting orientation of a membrane is changed and, particularly, for explaining a method for controlling the welding torch when the welding torch is traveled in a vertical direction. As shown in FIG. 11, a fusion tends to sag around the apex 22 of the corrugate portion by its own weight. The welding torch angle is controlled so that the welding torch is inclined a little upward to push up the fusion by arc. Thus, the weld bead is prevented from sagging.

As shown in FIG. 8, a membrane is mounted to the welding machine with the corrugation portion facing downward or upward, or with the corrugation portion facing sideward and extending horizontally or vertically. Movement parameters such as indicative of welding torch angle are determined for every mounting orientation of the membranes 1 and 2. The mounting orientation of a membrane is not automatically detected but manually input, for example, by selecting a number of a rotary switch provided in the robot controlling device to specify the mounting orientation of the membrane, and the movement parameters are set for every mounting orientation.

Next, an explanation will be given to a second embodiment of the present invention.

Figure 12:
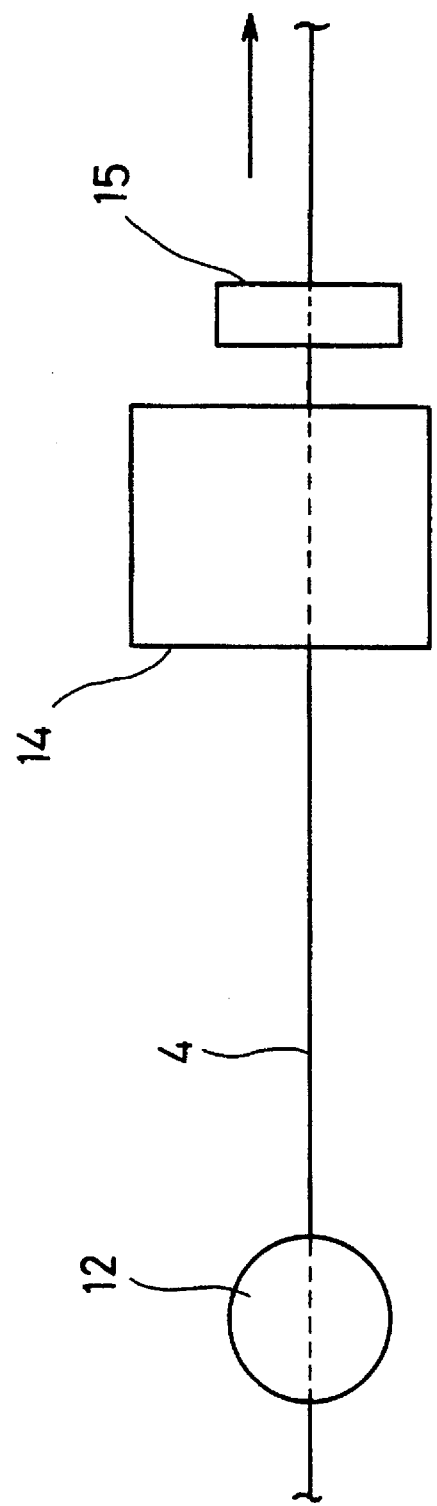
FIG. 12 is a schematic top plan view of a welding robot for corrugation lap joint to be utilized in a method for welding corrugate portions in accordance with a second embodiment of the present invention.

FIG. 12 is a schematic top plan view of a welding robot for corrugation lap joint to be utilized in the welding method of the second embodiment. In the welding robot utilized in the first embodiment, the visual sensor 14 and the laser displacement sensor 15 for sensing corrugate configuration are aligned in a direction perpendicular to the robot traveling direction, as shown in FIG. 2, for simplification of the construction of the welding robot. In the welding robot to be used in the second embodiment, however, the laser displacement sensor 15 for sensing the deformation degree of the corrugate portion is disposed forwardly of the visual sensor 14 to perform measurement along the weld line 4 which is liable to be deformed. The welding torch 12, visual sensor 14 and laser displacement sensor 15 are located in alignment with each other along the weld line 4. Of course, the welding robot to be utilized in the second embodiment may be used in the first embodiment.

Figure 13:
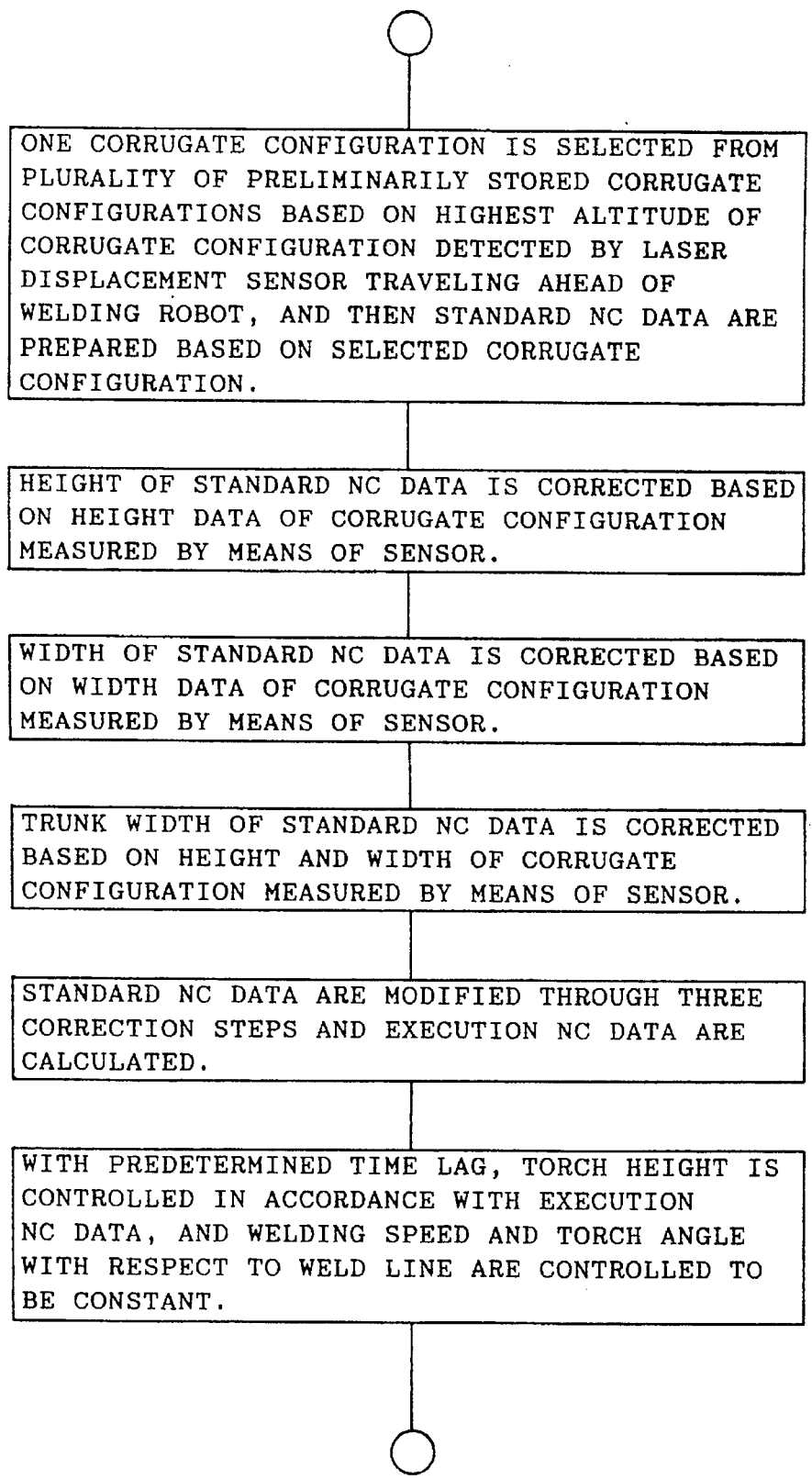
FIG. 13 is a flow chart illustrating the method for welding corrugate portions by means of the welding robot for corrugation lap joint in accordance with the second embodiment.

FIG. 13 is a flow chart illustrating the method for welding corrugate portions by means of the welding robot for corrugation lap joint in accordance with the second embodiment. The essential point is that standard corrugation NC data to be utilized when a robot control software is implemented are modified based on the deformation degree of the corrugate portion, and execution NC data for actual welding are calculated, whereby the welding torch is traveled in accordance with the deformation degree of the corrugate portion.

There will next be described a method for detecting the positions of the apex T, and the starting point S and terminal point E of the foot regions, a procedure of correcting the configuration based on the positional data of the apex T, and the starting point S and terminal point E of the foot regions, and a method for correcting a trunk configuration in the configuration correction of the corrugate portion.

The coordinates of the apex T, the starting point S and terminal point E of the foot regions are determined based on data obtained by the laser displacement sensor 15. More specifically, the coordinates of the apex T are determined as a point having the smallest Z-axis data measured by means of the laser displacement sensor 15 (a point which is the closest to the laser displacement sensor 15). The coordinates of the starting point S and termination point E of the foot regions are calculated from the data of the laser displacement sensor 15 on the basis of the coordinates of the apex T, and determined from the displacement degree of the Z-axis data around the foot regions.

The measurement method of the apex T and the starting point S and terminal point E of the foot regions for determination of the corrugate configuration will be described in more detail. The configuration corrections are performed separately for the front region and rear region of the corrugate portion. The laser displacement sensor 15 performs measurement around the front flat region Aa, apex region C and rear flat region Ab, and calculates the height Ha of the corrugate portion with respect to the front flat region Aa and the height Hb of the corrugate portion with respect to the rear flat region Ab, and the front-side foot width La and the rear-side foot region Lb. The measurement process is as follows.

(1) Measurement data obtained while the laser displacement sensor 15 passes through the front flat region Aa of the corrugate portion until the sensor 15 becomes unable to perform measurement are stored as data of the front flat region.

(2) After the laser displacement sensor 15 becomes unable to perform measurement, an apex-searching algorithm for determining the apex T from the distance between the laser displacement sensor and the apex T is implemented to obtain the positional data of the apex T.

(3) When the position of the apex T is determined, the measurement data obtained around a point located rearwardly apart from the apex T by about a half the foot width of a standard corrugate configuration is analyzed to obtain the positional data of the starting point S of the uprising foot region of the corrugate portion. The method for obtaining the positional data of the starting point S of the foot region will be detailed later.

(4) By comparing the data of the apex T with the data of the front flat region Aa and then with the data of the starting point S of the front uprising foot region, the height Ha of the corrugate portion and foot width La in the front region are determined.

(5) After the position of the apex T is determined, measurement is continuously performed. Measurement data obtained after the sensor becomes able to perform measurement are stored as data of the rear flat region.

(6) Data of the rear flat region obtained around a point located forwardly apart from the apex T by about a half the foot width of the standard corrugate configuration are analyzed to obtain the positional data of the terminal point E of the rear region of the corrugate portion.

(7) By comparing the data of the apex T with the data of the rear flat region Ab and then with the positional data of the terminal point E of the rear foot region, the height Hb of the corrugate portion and foot width Lb in the rear region are determined.

The algorithm for detecting the starting point S (or the terminal point E) of the foot region of the corrugate portion will hereinafter be described in further detail. The algorithm for detecting the terminal point E is substantially the same as that for detecting the starting point S and, therefore, the explanation therefor is dispensed with.

Figure 14A:
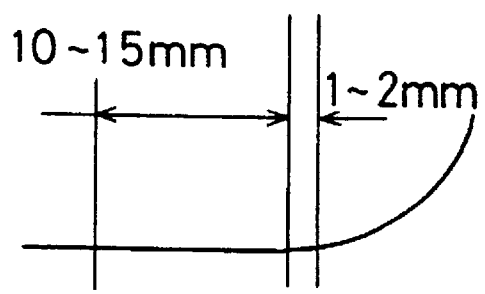
FIGS. 14(a) and 14(b) are diagrams for explaining an algorithm for detecting edges of foot regions of the corrugate portion.

(1) When the data of the apex T is obtained, the inclination around the starting point of the foot region is examined. More specifically, a point located rearwardly apart from the apex T by about a half the foot width of the standard corrugate configuration is assumed to be a base point, as shown in FIG. 14(a). By assuming a point located forwardly apart from the base point by 1 mm to 2 mm to be a reference point, a slight inclination which has been generated by a load in the pressing of the membrane around the foot edge portion is determined from the measurement data obtained in a flat region having a width of 10 mm to 15 mm.

Figure 14B:
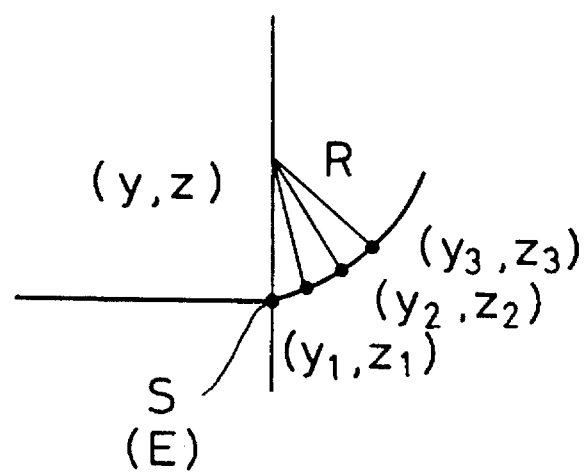

(2) The position of the starting point S of the foot region of the corrugate portion is inferred from the inclination thus determined. More specifically, the measurement data of the foot region is corrected in consideration of the inclination generated in the pressing of the membrane. The inclined portion is considered to be part of the flat portion when the starting point of the arcuate portion is detected. Three points are located in appropriate intervals on the aforesaid arcuate portion accurately measured by means of the laser displacement sensor 15, as shown in FIG. 14(b), and a circle defined by these three points is determined. Then, a projection of the center of the circle onto the base line is regarded as the starting point S (or the terminal point E) of the foot region of the corrugate portion. The radius R and center (y, z) of the circle defined by the three points (y1, z1), (y2, z2) and (y3, z3) are calculated from the following equation (1):

$$R = \frac{a^2 + b^2}{4} - c^2, z = -\frac{a}{2}, y = -\frac{b}{2} \quad (1)$$

$$a = \frac{(z_2^2 + y_2^2) - (z_1^2 + y_1^2) - (y_1 - y_2) \cdot b}{(z_1 - z_2)}$$

$$b = \frac{\frac{(z_1 - z_3)}{(z_1 - z_2)}[(z_2^2 + y_2^2) - (z_1^2 + y_1^2)] - [(z_3^2 + y_3^2) - (z_1^2 + y_1^2)]}{\left[ \frac{(z_1 - z_3)(y_1 - y_2)}{(z_1 - z_2)} - (y_1 - y_3) \right]}$$

$$c = -[z_1 \cdot a + y_1 \cdot b + z_1^2 + y_1^2]$$

Next, there will be described a procedure of correcting the configuration of the corrugate portion based on the data of the apex, and the starting point S and terminal point E of the foot regions, and a method for correcting a trunk configuration.

(1) Parameter for height correction

Figure 15A:
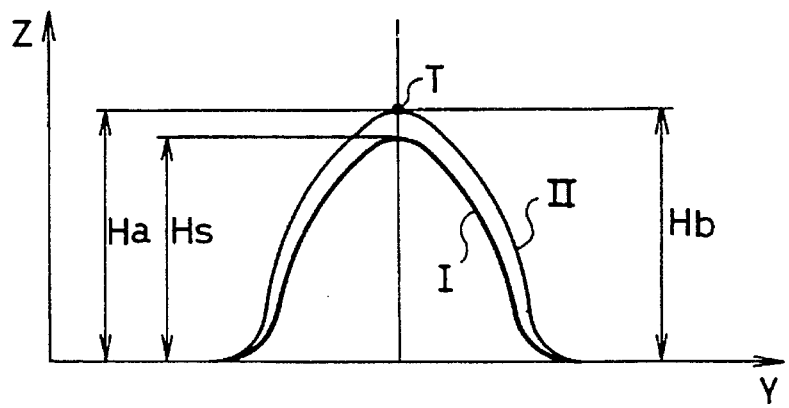
FIGS. 15(a), 15(b), and 15(c) are diagrams for explaining a method for correcting standard corrugation NC data based on three parameters.

FIG. 15(a) illustrates a height correction, in which a reference character I denotes a standard corrugate configuration and a reference character II denotes a corrugate configuration obtained after height correction. To determine a height correction factor for the front region in the height correction, a height Ha of the corrugate portion with respect to the base line in the front flat region Aa (see FIG. 3) determined by the measurement is compared with a height Hs of the standard corrugate configuration I. To determine a height correction factor for the rear region, a height Hb of the corrugate portion with respect to the base line in the rear flat region Ab (see FIG. 3) is compared with the height Hs of the standard corrugate configuration I. New configuration data II are obtained by multiplying height data obtained along the contour of the standard corrugation in the front and rear regions by the height correction factors for the front region and for the rear region, respectively. At this time, a difference between the lengths of the arcuate portion of the corrugation before and after the correction should be determined. However, it has been proved by an experimental calculation that, where the height correction factors are proximate to 1.00 whether the correction factor is greater than 1.0 (for enlargement) or less than 1.0 (for reduction), the change in the length of the arcuate portion is directly proportional to the correction factors.

(2) Parameter for width correction

Figure 15B:
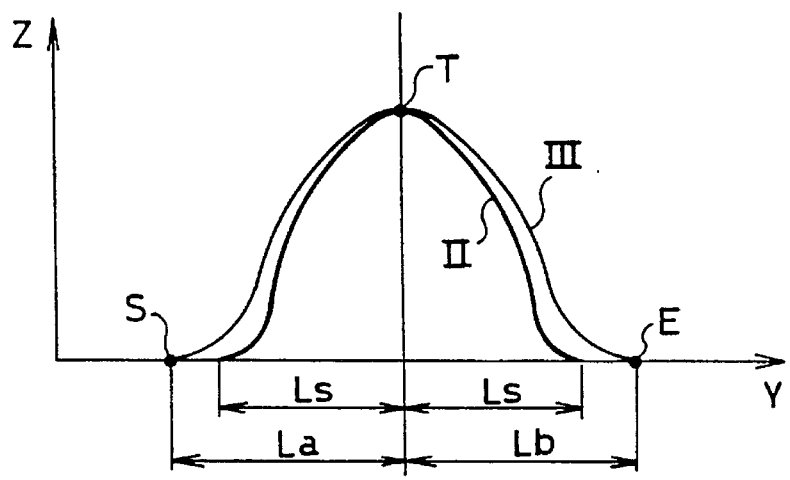

FIG. 15(b) illustrates a width correction, in which a reference character II denotes the corrected configuration data shown in FIG. 15(a) and a reference character III denotes a configuration obtained after the width correction. To determine width correction factors for the front and rear regions, the foot width La in the front region and the foot width Lb in the rear region determined in the aforesaid manner are compared with the foot width Ls of the standard corrugate configuration. Then, new configuration data III are obtained by multiplying width data obtained along the contour of the standard corrugation in the front and rear regions by the width correction factors for the front region and for the rear region, respectively.

At this time, a difference between the lengths of the arcuate portion of the corrugation before and after the correction should be determined. However, it has been proved by an experimental calculation that, where the width correction factors are proximate to 1.00 whether the correction factor is greater than 1.0 (for enlargement) or less than 1.0 (for reduction), the change in the length of the arcuate portion is directly proportional to the correction factors. This feature is not remarkably changed after the height correction.

(3) Parameter for trunk correction

Figure 15C:
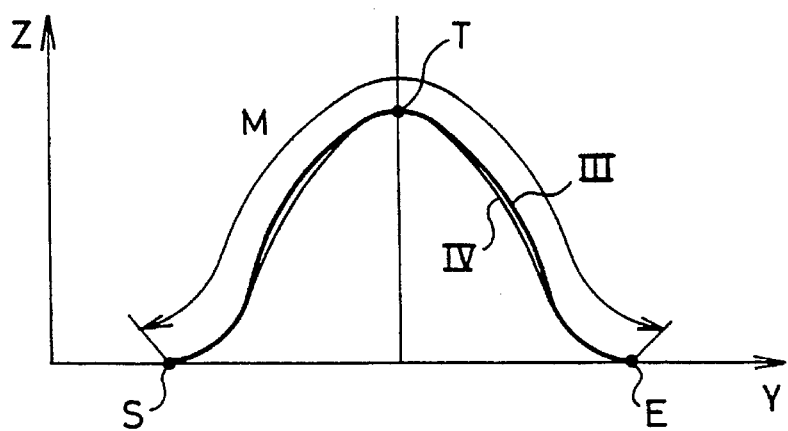

FIG. 15(c) illustrates a correction for trunk portion of the corrugation, in which a reference character III denotes the new configuration data shown in FIG. 15(b) and a reference character IV denotes a configuration after the trunk correction. In the trunk correction, the length of the arcuate portion changed in the height correction and the width correction is corrected. At this time, the length M of the arcuate portion of the corrugate portion should be the same as that of the standard corrugation even if the contour of the corrugate portion is deformed. More specifically, the swell degree of the trunk portion of the corrugate portion is changed without changing the positions of the starting point S of the foot region, the apex T and the terminal point E of the foot region obtained from the aforesaid calculations. Unlike the height correction or the width correction, the trunk correction for the enlargement of the corrugation is made in a slightly different manner from that for the reduction of the corrugation. Therefore, a suitable correction equation is selected from the following equations depending on whether the correction is to be made for the enlargement, or reduction of the corrugation.

The correction equations for the correction of the trunk configuration of the corrugate portion will hereinafter be described in more detail. Reference characters to be used in the correction equations will herein denote as follows:

y: Y-axis value (value measured in a traveling direction)

$y_n$: Y-axis value after correction $y_w$: Width of foot region of corrugate portion z: Z-axis value (value measured in a heightwise direction)

$z_n$: Z-axis value after correction $z_H$: Height of corrugate portion r: Correction factor (1) Enlargement of trunk portion In this case, the trunk portion is enlarged in a heightwise direction (in a Z-axis direction), but not in a widthwise direction (in a Y-axis direction).

The same correction equation is employed for the correction of the trunk portion in the heightwise direction for the front and rear regions. The correction equation is as follows:

$$z_n = z + z \times \frac{(z_H - z)}{z_H} \times (r - 1) \quad (2)$$

In this equation, the correction factor r varies depending on the kind of the corrugation (whether the corrugation has a smaller height T or a greater height T).

* Smaller corrugation

If the variation in the length of the arcuate portion is 0 mm to 1.08 mm, the correction factor r is calculated from the following equation (3):

$$r = \frac{(\text{Variation}/0.12)}{30} + 1.0 \quad (3)$$

If the variation in the length of the arcuate portion exceeds 1.08 mm, the correction factor r is calculated from the following equation (4):

$$r = \frac{(\text{Variation}/0.12 - 10)}{52.5} + \frac{40}{30} \quad (4)$$

* Larger corrugation

If the variation in the length of the arcuate portion is 0 mm to 2.16 mm, the correction factor r is calculated from the following equation (5):

$$r = \frac{(\text{Variation}/0.12) \times 0.15}{8.0} + 1.0 \quad (5)$$

If the variation in the length of the arcuate portion exceeds 2.16 mm, the correction factor r is calculated from the following equation (6):

$$r = \frac{(\text{Variation}/0.12 - 18)}{52.5} + 1.3375 \quad (6)$$

(2) Reduction of trunk portion

In this case, the trunk portion is enlarged in a widthwise direction (in the Y-axis direction), but not in a heightwise direction (in the Z-axis direction).

When the size of the trunk portion is reduced, the contours of the trunk portion in the front and rear regions are moved in opposite directions. Therefore, a correction equation for the width correction in the front region is different from that for the width correction in the rear region. The Y-axis value $Y_n$ for the front region after the width correction is as follows:

$$y_n = y - \left(\frac{1}{2} y_w - y\right)^2 \times \frac{2}{y_w} \times \frac{z}{z_H} \times (r-1) \quad (7)$$

The Y-axis value $Y_n$ for the rear region after the width correction is as follows:

$$y_n = y + \left(\frac{1}{2} y_w - y\right)^2 \times \frac{2}{y_w} \times \frac{z}{z_H} \times (r-1) \quad (8)$$

In this equation, the correction factor r varies depending on whether the corrugation has a smaller height T or a greater height T.

* Smaller corrugation

If the variation in the length of the arcuate portion exceedes 0.12 mm, the correction factor r is calculated from the following equation (9):

$$r = \frac{(\text{Variation}/0.12 + 1.25)}{20} + 1.0 \quad (9)$$

* Larger corrugation

If the variation in the length of the arcuate portion is 0.12 mm to 1.8 mm, the correction factor r is calculated from the following equation (10):

$$r = \frac{(\text{Variation}/0.12 + 1.0)}{40} + 1.0 \quad (10)$$

If the variation in the length of the arcuate portion exceeds 1.8 mm, the correction factor r is calculated from the following equation (11):

$$r = \frac{\text{Variation}}{2.4} + 1.4 \quad (11)$$

Although the configuration of the corrugate portion is corrected by successively using the parameters (1), (2) and (3) in the aforesaid correction method, all of these three parameters are not necessarily used for the correction of the corrugate configuration. More specifically, where the measured height of the corrugate portion is greater than that of the standard corrugate configuration I, the measured trunk width of the corrugate portion generally tends to be smaller than that of the standard corrugate configuration I. On the other hand, where the measured height of the corrugate portion is less than that of the standard corrugate configuration I, the measured trunk width of the corrugate portion generally tends to be larger than that of the standard corrugate configuration I. Therefore, the configuration correction can be achieved by first correcting the height with the parameter (1) and then correcting the width with the parameter (2). Where the measured height and width of the corrugate portion are both less than those of the standard corrugate configuration I, however, the trunk portion of the corrugation generally tends to swell and, therefore, the configuration correction requires the parameter (3).

In this correction method, the corrugate configuration is corrected on the assumption that the length of the arcuate portion of the corrugation is not changed by the change in the configuration of the corrugate portion.

Based on the thus quantified values indicative of the deformation degree, standard corrugation NC data to be utilized when the robot control software is implemented are modified, and execution NC data for welding are calculated and stored in an execution NC data memory. The calculation of the execution NC data is performed immediately after the laser displacement sensor 15 performs the measurement on respective corrugate portions of the membrane and the parameters indicative of the deformation of the respective corrugate portions are determined. Thereafter, execution NC data are successively generated by modifying the standard NC data and stored in the execution NC data memory, and the welding control is performed on the basis of the execution NC data. Therefore, the welding torch never misses the welding target due to the deformation of the corrugate portion.

Although the present invention has been described in detail by way of the embodiments thereof, it should be understood that the foregoing disclosure is merely illustrative of the technical principles of the present invention but not limitative of the same. The spirit and scope of the present invention are to be limited only by the terms of the appended claims.

What is claimed is:

1. A method for welding a corrugate portion by means of a welding robot for a corrugation lap joint, in which a sensor for measurement of a corrugate configuration travels ahead of the welding robot and controls a welding torch, said method comprising the steps of:

preliminarily storing a plurality of standard corrugate configurations as data in a control device;

selecting one standard corrugate configuration from data preliminarily stored in the control device based on the measurement of the sensor traveling ahead of the welding robot;

obtaining numerical control (NC) data of a welding line of the corrugate portion based on the selected standard corrugate configuration;

employing parameters for increasing a welding speed in a foot region of the corrugate portion by gradually changing a torch angle slightly before the welding torch reaches an arcuate portion of the foot region, along with the NC data of the welding line;

employing parameters for increasing the welding speed in an apex of the corrugate portion along with the NC data of the welding line; and controlling the welding speed and the welding torch angle to weld the corrugate portion by employing said parameters.

2. A method for welding a corrugate portion by means of a welding robot for a corrugation lap joint, which employs a control system in which a sensor for measurement of the corrugate configuration travels ahead of the welding robot and corrugate configurations are preliminarily stored as numerical control (NC) data in a control device, said method comprising the steps of:

calculating a deformation degree of a bulge of the corrugate portion along a weld line based on information indicative of a height and foot width of the corrugate configuration measured by means of the sensor;

modifying standard corrugation NC data based on the calculated degree;

calculating execution NC data for welding; and controlling an operation for the welding of the corrugate portion by utilizing the execution NC data.

3. A method as set forth in claim 2, further comprising the steps of:

employing parameters for optionally changing a welding speed and a welding torch angle for welding a foot and apex of the corrugate portion along with the execution NC data for welding; and controlling the welding speed and the welding torch angle for welding the corrugate portion by employing said parameters.

4. A method as set forth in claim 2, further comprising the steps of:

determining a height of the corrugate portion, based on data of at least one of a front flat region and a rear flat region of the corrugate portion and data of an apex of the corrugate portion;

comparing the height of the corrugate portion with a height of a standard corrugation to determine a height correction factor;

obtaining first corrugate configuration data subjected to a height correction by multiplying the height of the standard corrugation by the height correction factor;

determining a foot width of the corrugate portion, based on data of a starting point and a terminal point of a foot region of the corrugate portion and data of the apex of the corrugate portion;

comparing the foot width with a width of the standard corrugation to determine a width correction factor;

obtaining second corrugate configuration data subjected to a width correction by multiplying the foot width of the first corrugate configuration subjected to the height correction by the width correction factor; and employing the second corrugate configuration data as execution NC data for the welding of the corrugate portion.

5. A method as set forth in claim 4, further comprising the step of:

correcting a swell degree of a trunk portion of the corrugate portion without changing the positions of the apex and the starting point and terminal point of the foot portion, so that a length of an arcuate portion of the corrugate portion changed by the height correction and the width correction is rendered equal to a length of an arcuate portion of the standard corrugation.

* * * * *